US012801748B2

(12) United States Patent
Terpstra et al.

(10) Patent No.: US 12,801,748 B2
(45) **Date of Patent: *Nov. 17, 2026**

(54) COMPUTING DEVICE QUARANTINE ACTION SYSTEM

(71) Applicant: Dell Products L.P., Round Rock, TX (US)

(72) Inventors: John H. Terpstra, Austin, TX (US); Jeroen Diederik Cornelis Antonius Mackenbach, Roosendaal (NL)

(73) Assignee: Dell Products L.P., Round Rock, TX (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/934,460

(22) Filed: Nov. 1, 2024

(65) Prior Publication Data

US 2025/0061204 A1 Feb. 20, 2025

Related U.S. Application Data

(63) Continuation of application No. 17/699,321, filed on Mar. 21, 2022, now Pat. No. 12,164,639.

(51) Int. Cl.

*G06F 15/16* (2006.01)
*G06F 21/55* (2013.01)
*G06F 21/57* (2013.01)

(52) U.S. Cl.

CPC .......... *G06F 21/572* (2013.01); *G06F 21/554* (2013.01); *G06F 2221/034* (2013.01)

(58) Field of Classification Search

CPC . G06F 21/572; G06F 21/554; G06F 2221/034
See application file for complete search history.

(56) References Cited

U.S. PATENT DOCUMENTS

| | | | | |
|---|---|---|---|---|
| 11,258,671 | B1 * | 2/2022 | Vora | H04L 43/0876 |
| 2013/0013905 | A1 * | 1/2013 | Held | G06F 21/572 713/2 |
| 2015/0149827 | A1 * | 5/2015 | Landry | G06F 11/0706 714/37 |

* cited by examiner

*Primary Examiner* — Normin Abedin
(74) *Attorney, Agent, or Firm* — Joseph Mencher

(57) ABSTRACT

A computing device quarantine action system includes a computing device having a plurality of computing device components and a Basic Input/Output System (BIOS) subsystem. During an initialization process, the BIOS subsystem determines a current computing device component inventory of the plurality of computing device components included in the computing device, measures a current computing device functionality of each of the plurality of computing device components, and identifies at least one computing device change between at least one of 1) a reference computing device component inventory and the current computing device component inventory, and 2) reference computing device functionalities and the current computing device component functionalities determined for each of the plurality of computing device components. Based in the at least one computing device change, the BIOS subsystem generates a Quarantine Action Metric (QAM) and, based on the QAM, performs at least one quarantine action associated with the computing device.

20 Claims, 10 Drawing Sheets

900

| DEVICE | ID OK | F(n) OK | ID OK | F(n) OK | ID OK | F(n) OK | ID OK | F(n) OK | ... | ID OK | F(n) OK |
|---|---|---|---|---|---|---|---|---|---|---|---|
| MEMORY MODULES | 0 | 0 | | | | | | | | | |
| CPU | | | 0 | 0 | | | | | | | |
| USB HUB (1-n) | | | | | 0 | 0 | | | | | |
| PCIe SOCKETS (1-n) | | | | | | | 0 | 0 | | | |
| SENSOR (1-n) | | | | | | | | | | | |
| VOLTAGE RAILS (1-n) | | | | | | | | | | | |
| DISK DRIVES (1-n) | | | | | | | | | | | |
| CHASSIS TAMPER DETECT | | | | | | | | | | 0 | 0 |

902

| | | | | | | | | | | | |
|---|---|---|---|---|---|---|---|---|---|---|---|
| CRITICAL-1 | 0 | 1 | 0 | 1 | 0 | 0 | 0 | 1 | | 0 | 0 |
| CRITICAL-2 | 0 | 0 | 0 | 0 | 1 | 1 | 1 | 0 | | 1 | 0 |
| CRITICAL-3 | 1 | 0 | 0 | 0 | 0 | 0 | 0 | 0 | | 0 | 0 |
| WARNING-1 | 0 | 0 | 1 | 0 | 0 | 0 | 0 | 0 | | 0 | 0 |
| WARNING-2 | 0 | 0 | 0 | 0 | 0 | 0 | 0 | 0 | | 0 | 1 |

FIG. 9A

900

| DEVICE | ID OK | F(n) OK | ID OK | F(n) OK | ID OK | F(n) OK | ID OK | F(n) OK | ..... | ID OK | F(n) OK |
|---|---|---|---|---|---|---|---|---|---|---|---|
| MEMORY MODULES | 0 | 1 | | | | | | | | | |
| CPU | | | 0 | 0 | | | | | | | |
| USB HUB (1-n) | | | | | 0 | 0 | | | | | |
| PCIe SOCKETS (1-n) | | | | | | | 1 | 0 | ..... | | |
| SENSOR (1-n) | | | | | | | | | | | |
| VOLTAGE RAILS (1-n) | | | | | | | | | | | |
| DISK DRIVES (1-n) | | | | | | | | | | | |
| CHASSIS TAMPER DETECT | | | | | | | | | | 0 | 0 |

902

| | | | | | | | | | | |
|---|---|---|---|---|---|---|---|---|---|---|
| CRITICAL-1 | 0 | 1 | 0 | 1 | 0 | 0 | 0 | 1 | 0 | 0 |
| CRITICAL-2 | 0 | 0 | 0 | 0 | 1 | 1 | 1 | 0 | 1 | 0 |
| CRITICAL-3 | 1 | 0 | 0 | 0 | 0 | 0 | 0 | 0 | 0 | 0 |
| WARNING-1 | 0 | 0 | 1 | 0 | 0 | 0 | 0 | 0 | 0 | 0 |
| WARNING-2 | 0 | 0 | 0 | 0 | 0 | 0 | 0 | 0 | 0 | 1 |

FIG. 9B

COMPUTING DEVICE QUARANTINE ACTION SYSTEM

CROSS-REFERENCE TO RELATED APPLICATION

The present application is a continuation of U.S. patent application Ser. No. 17/699,321, filed Mar. 21, 2022, the disclosure of which is incorporated by reference herein in its entirety.

BACKGROUND

The present disclosure relates generally to information handling systems, and more particularly to performing quarantine actions on computing devices from within a firmware environment, and potentially passing Quarantine Action data to downstream systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, may be provided in environments that can be detrimental to the security and/or integrity of those computing devices. For example "edge" computing devices may be provided at an industrial location and/or at the edge of a network, and may be subject to environmental hazards such as exposure to relatively high and low temperatures, dust, humidity, electronic interference, at-risk network connectivity, and physical abuse, as well as the potential for malicious interference. Furthermore, components in such edge computing devices are often modified (e.g., components may be added, removed, swapped, etc. in those computing devices) subsequent to the manufacture of the computing device. As will be appreciated by one of skill in the art in possession of the present disclosure, the exposure to environmental factors can cause premature degradation of the computing device components in the computing device, while tampering with the computing device (be it deliberate, intentional, or accidental) may negatively affect the security and operational integrity of the computing device.

Accordingly, it would be desirable to provide for the performance of quarantine actions for computing devices subject to the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: determine, during an initialization process, a current computing device component inventory of a plurality of computing device components included in a computing device; measure, during the initialization process, a current computing device functionality of each of the plurality of computing device components; identify at least one computing device change between at least one of: a reference computing device component inventory and the current computing device component inventory; and reference computing device functionalities and the current computing device component functionalities determined for each of the plurality of computing device components; generate, based in the at least one computing device change, a Quarantine Action Metric (QAM); and perform, based on the QAM, at least one quarantine action associated with the computing device.

BRIEF DESCRIPTION OF THE DRAWINGS

FIG. 9A is a schematic view illustrating an embodiment of a QAM table that is provided according to the teachings of the present disclosure in the computing device of FIG. 3 during the method of FIG. 4.

FIG. 9B is a schematic view illustrating an embodiment of the QAM table of FIG. 9A following modification by the computing device of FIG. 3 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
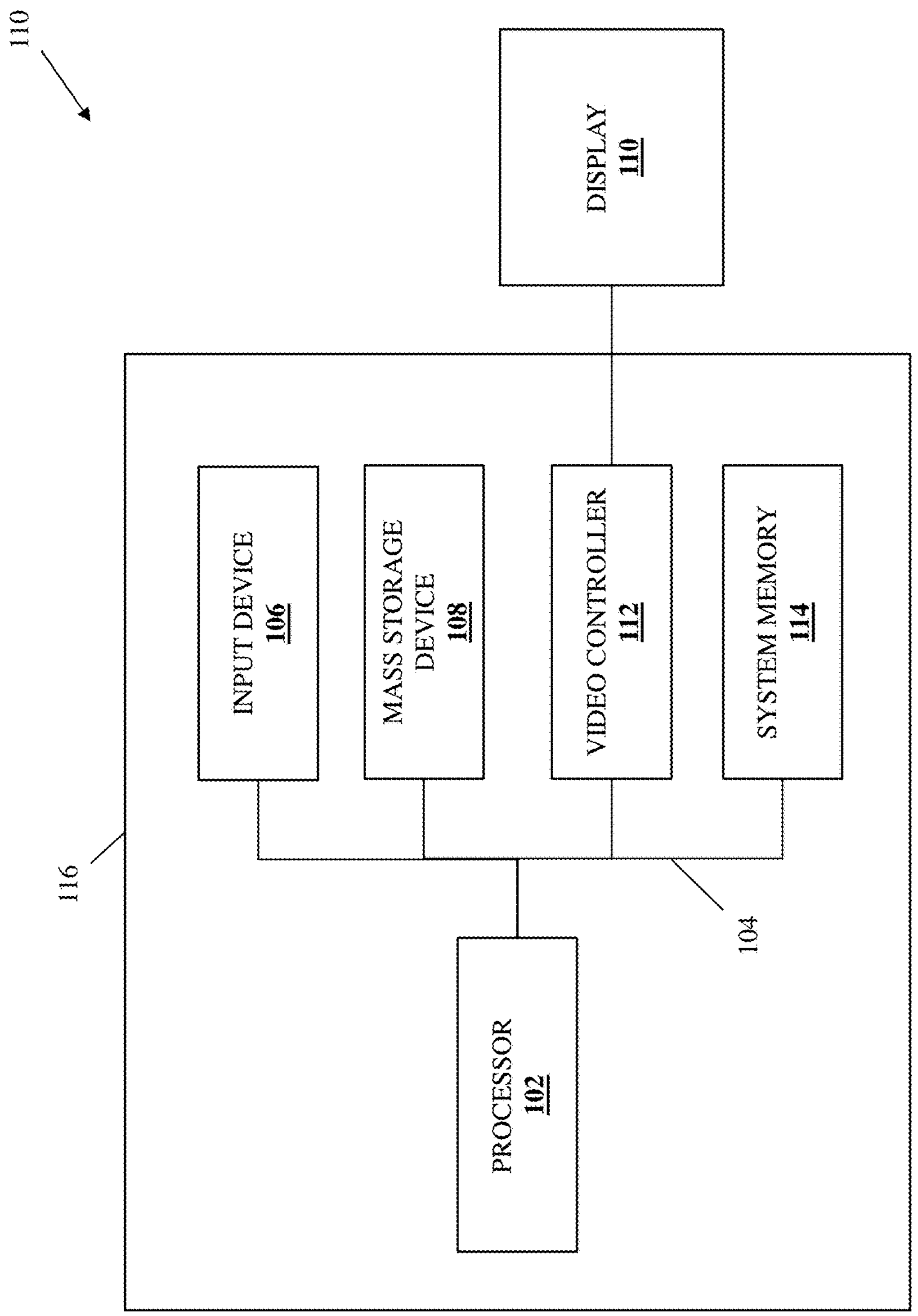
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
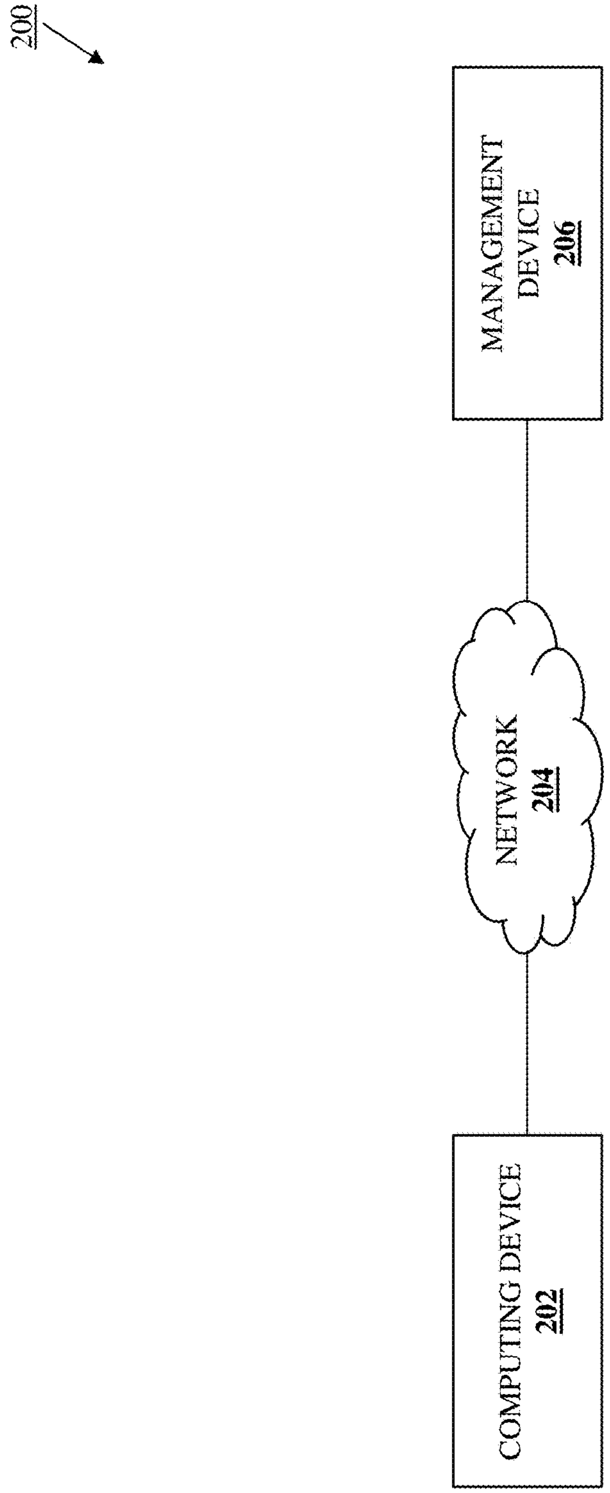
FIG. 2 is a schematic view illustrating an embodiment of networked system that may include the computing device quarantine action system of the present disclosure.

Referring now to FIG. 2, an embodiment of a networked system 200 is illustrated that may include the computing device quarantine action system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in the specific example below is described as being provided by a server device. However, while illustrated and discussed as being provided by a server device, one of skill in the art in possession of the present disclosure will recognize that computing devices provided in the networked system 200 may include any devices (e.g., networking devices (e.g., switch devices, router devices, etc.), storage systems, desktop computing devices, laptop/notebook computing devices, tablet computing devices, mobile phones, etc.) that may be configured to operate similarly as the computing device discussed below. In the illustrated embodiment, the computing device 202 may be coupled to a network 204 that may be provided by a Local Area Network (LAN), the Internet, combinations thereof, and/or any other networks that would be apparent to one of skill in the art in possession of the present disclosure.

In the illustrated embodiment, a management device 206 is coupled to the computing device 202 via the network 204. In an embodiment, the management device 206 may be provided by the IHS 100 discussed above with reference to FIG. 1, and/or may include some or all of the components of the IHS 100, and in the specific example below is described as being provided by desktop server devices and/or other management devices that would be apparent to one of skill in the art in possession of the present disclosure. In the embodiments illustrated and described below, the management device 206 is controlled by an "orchestrator" (e.g., an "edge orchestrator" for edge computing devices), and may provide an automated, policy-based quarantine action remediation system that may assist in the automated remediation of quarantine actions performed on/by the computing device 202. However, while a specific networked system 200 is illustrated and described, one of skill in the art in possession of the present disclosure will recognize that the computing device quarantine action system of the present disclosure may include a variety of components and component configurations while remaining within the scope of the present disclosure as well.

Figure 3:
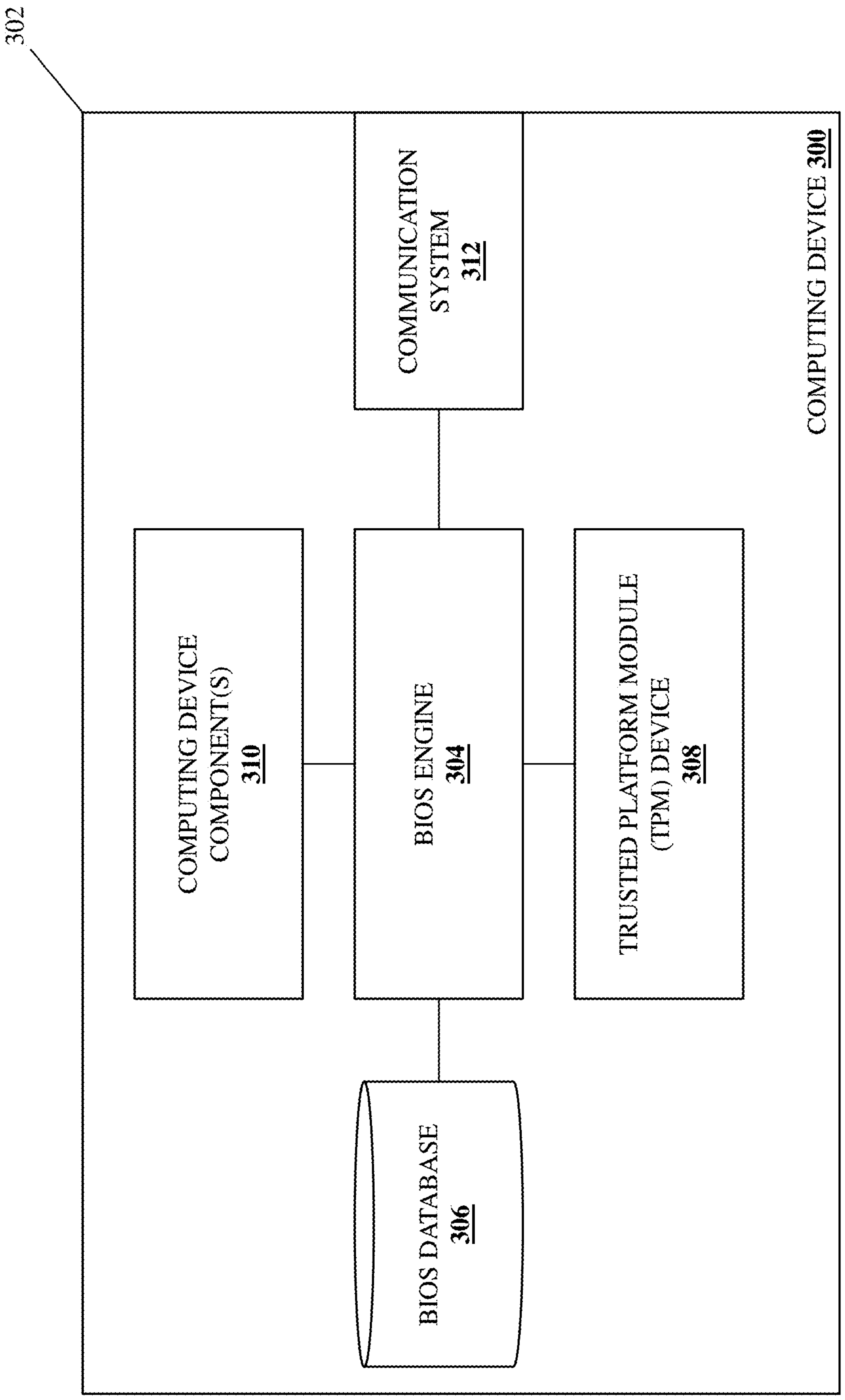
FIG. 3 is a schematic view illustrating an embodiment of a computing device that may provide the computing device quarantine action system of the present disclosure.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in the specific examples below is described as being provided by a server device. However, while illustrated and discussed as being provided by a server device, one of skill in the art in possession of the present disclosure will recognize that the functionality of the computing device 300 discussed below may be provided by other devices (e.g., networking devices (e.g., switch devices, router devices, etc.), storage systems, desktop computing devices, laptop/notebook computing devices, tablet computing devices, mobile phones, etc.) while remaining within the scope of the present disclosure. In the illustrated embodiment, the computing device 300 includes a chassis 302 that houses the components of the computing device 300, only some of which are illustrated and discussed below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a BIOS engine 304 that is configured to perform the functionality of the BIOS engines, BIOS subsystems, and/or BIOS devices discussed below. As will be appreciated by one of skill in the art in possession of the present disclosure, the BIOS engine 304 may be provided by firmware and may be configured to perform hardware initialization for the computing device 300 during an initialization process (e.g., Power On Self Test (POST)) for the computing device 300, runtime services for operating systems and applications provided on the computing device 300 when the computing device 300 is in a runtime state, as well as other BIOS functionality known in the art. Furthermore, one of skill in the art in possession of the present disclosure will recognize that the BIOS engine 304 is described herein as being provided by the Unified Extensible Firmware Interface (UEFI) "BIOS", which has been provided to replace the legacy BIOS traditionally utilized in many computing devices (while providing support for legacy BIOS services), and defines a software interface between operating systems and platform firmware.

As such, in some embodiments at least some of the functionality of the BIOS engine 304 discussed below may be provided by a UEFI module. However, in other embodiments, at least some of the functionality of the BIOS engine 304 discussed below may be provided by a remote access controller device such as an integrated DELL® Remote Access Controller (IDRAC) device available in server devices provided by DELL® Inc. of Round Rock, Texas, United States; a Baseboard Management Controller (BMC) device, an Out Of Band (OOB) controller, and/or other management/remote access controller devices that would be apparent to one of skill in the art in possession of the present disclosure. In a specific example, at least some of the functionality of the BIOS engine 304 discussed below may be performed by the iDRAC device discussed above as part of System Component Verification (SCV) functionality enabled for server devices provided by DELL® Inc. of Round Rock, Texas, United States. In an embodiment, the TCG Server Management Domain Firmware Profile Specification, Family "2.0", Level 00 Revision 1.00, dated Dec. 10, 2020 may be utilized to implement the platform certificate profile generation functionality of the BIOS engine 304 (e.g., firmware) or remote access controller device discussed above. As will be appreciated by one of skill in the art in possession of the present disclosure, the TCG Server Management Domain Firmware Profile Specification defines a standard for the generation of platform certificate profiles, and the teaching of the present disclosure extend that functionality to derive the Quarantine Action Metric (QAM) discussed below that automates the determination of whether to perform quarantine actions on networked systems with hundreds, if not thousands, of computing devices within the need for human interaction.

The chassis 302 may also house a storage system (not illustrated, but which may include the storage 108 discussed above with reference to FIG. 1) that is coupled to the BIOS engine 304 (e.g., via a coupling between the storage system and the processing system) and that includes a BIOS database 306 that is configured to store any of the information utilized by the BIOS engine 304 discussed below. For example, the BIOS database 306 may store initialization code (e.g., SECurity (SEC) boot phase code, Pre-Extensible Firmware Interface (EFI) Initialization (PEI) boot phase code, Direct execution Environment (DXE) code, and/or other BIOS code described below) utilize by the BIOS engine 304 during initialization operations for the computing device 202. In the illustrated embodiment, the chassis 302 also houses a Trusted Platform Module (TPM) device 308 that is coupled to the BIOS engine 304, and that one of skill in the art in possession of the present disclosure will recognize may store the Platform Configuration Registers (PCRs) discussed in further detail below.

In the illustrated embodiment, the chassis 302 also houses computing device components 308 that are coupled to the BIOS engine 304, and that one of skill in the art in possession of the present disclosure will recognize may include processing systems (e.g., Central Processing Units (CPU(s)), memory systems (e.g., Dual Inline Memory Modules (DIMM(s)), Universal Serial Bus (USB) hub subsystems, Peripheral Component Interconnect express (PCIe) sockets, sensor devices, voltage rails, storage systems (e.g., Hard Disk Drives (HDDs), Solid State Drives (SSDs), etc.), chassis tamper detect subsystems, and/or any other computing device components that would be apparent to one of skill in the art in possession of the present disclosure.

The chassis 302 may also house a communication system 312 that is coupled to the BIOS engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
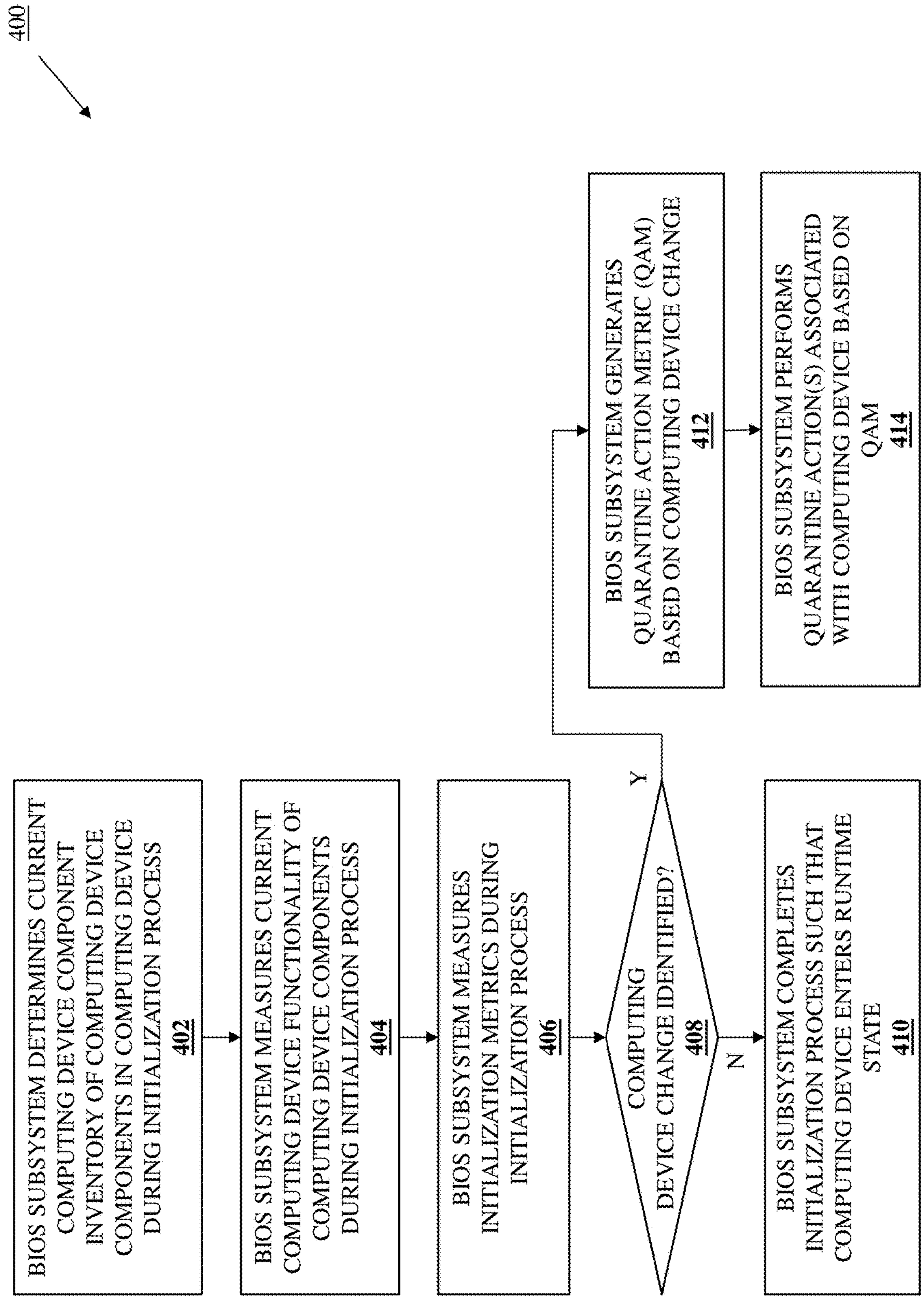
FIG. 4 is a flow chart illustrating an embodiment of a method for performing quarantine actions on a computing device.

Referring now to FIG. 4, an embodiment of a method 400 for performing quarantine actions on a computing device is illustrated. As discussed below, the systems and methods of the present disclosure provide for the identification of any changes to computing device components in a computing device via the use of computing device component measurements performed during initialization of the computing device, as well as for the generation of a Quarantine Action Metric (QAM) based on those changes, and the performance of corresponding quarantine action(s) based on the QAM. For example, the computing device quarantine action system of the present disclosure may include a computing device having a plurality of computing device components and a Basic Input/Output System (BIOS) subsystem. During an initialization process, the BIOS subsystem determines a current computing device component inventory of the plurality of computing device components included in the computing device, measures a current computing device functionality of each of the plurality of computing device components, and identifies at least one computing device change between at least one of 1) a reference computing device component inventory and the current computing device component inventory, and 2) reference computing device functionalities and the current computing device component functionalities determined for each of the plurality of computing device components. Based in the at least one computing device change, the BIOS subsystem generates a Quarantine Action Metric (QAM) and, based on the QAM, performs at least one quarantine action associated with the computing device. As such, the systems and methods of the present disclosure operate to extend POST boot operations to identify discrepancies at boot time, perform quarantine actions based on those discrepancies, and provide for automated remediation of those discrepancies (e.g., with that automated remediation determined/actioned from a management control plane). Thus, the nature of any change in a computing device component of a computing device may be identified and used to automatically perform quarantine action(s) on the computing device, which may allow associated risks to be remediated in order to minimize downtime of the computing device.

As discussed below, the present disclosure presents techniques to quantify risks associated with computing device components in a computing device that may have been tampered with and/or deteriorated in some manner, and then automatically perform quarantine action(s) based on that quantified risk in order to protect resources and/or services provided by that computing device. As discussed above, computing devices are often provided in physical areas that are not secure. For example, computing devices placed on a factory floor are often exposed to all manners of interference and risk, and even computing devices provided in relatively safe and protected datacenters which are not normally exposed to human traffic or extreme environments may still be impacted by the effects of deterioration and/or intrusion events. The systems and methods of the present disclosure attempt to identify any of these detrimental events associated with computing device components in a computing device, and perform actions based on the severity of those events.

To provide a specific example of the events discussed above, a Universal Serial Bus (USB) device may be inserted in a computing device, and a reboot of that computing device using data on that USB device may be attempted. As will be appreciated by one of skill in the art in possession of the present disclosure, such a boot from a USB device may be a nefarious act intended to compromise the integrity of the computing device or steal data from the computing device, or simply part of poor security practices, and the degree of risk such an event presents may justify particular levels of notification, potential action, and preventative measure implementation.

In another specific example of the events discussed above, a computing device may be rebooted and, upon reboot, a change in the processing system (e.g., a CPU) of the computing device since a last-known safe/factory state of the computing device may be detected. As will be appreciated by one of skill in the art in possession of the present disclosure, such a situation is unlikely to have compromised the integrity of the computing device, but may justify reporting to an administrator of the computing device, and may justify a reset of the computing device to its last-known safe/factory state. In a similar specific example, a computing device may be rebooted and, upon reboot, a memory device may be detected in the memory system (e.g., a CPU) of the computing device that was not present during a last-known safe/factory state of the computing device. As will be appreciated by one of skill in the art in possession of the present disclosure, such a situation is unlikely to have compromised the integrity of the computing device, but may justify reporting to an administrator of the computing device, and may justify a reset of the computing device to its last-known safe/factory state.

In yet another specific example of the events discussed above, a computing device may be rebooted and, upon reboot, a memory device may be detected in the memory system (e.g., a CPU) of the computing device with less memory storage space than was available during a last-known safe/factory state of the computing device. As will be appreciated by one of skill in the art in possession of the present disclosure, such a situation may result from a partial failure of the memory device, and a policy-based decision may be justified to determine whether it is safe to allow use of the memory device, or whether the integrity of the memory device has been compromised, with remediation and/or intervention performed in order to, for example, allow the memory device to be provided for multi-user service.

In yet another specific example of the events discussed above, a computing device may be rebooted and, upon reboot, a hardware measurement process may detect that a PCIe device has been inserted in the computing device that does not have a device identifier that is included in a database of permitted add-in devices. As will be appreciated by one of skill in the art in possession of the present disclosure, a policy-based decision may be justified to determine whether it is safe to allow use of the PCIe device.

In yet another specific example of the events discussed above, a computing device may be rebooted and, upon reboot, a BIOS/firmware boot signature may fail to validate. As will be appreciated by one of skill in the art in possession of the present disclosure, once the computing device has powered up and initialized the operating system, failure to validate a BIOS/firmware boot signature presents a significant risk that a nefarious intrusion has taken place. However, while several specific examples of firmware attack vectors, USB attack vectors, and other common attack vectors have been provided, one of skill in the art in possession of the present disclosure will appreciate that the examples above are only a small sample of security issues that may exist when a computing device is powered up, any or all of which may justify some quarantine action and possibly remediation before the computing device is put to use. However, in conventional systems, many (if not most) of these situations often go undetected, much less remediated.

As would be appreciated by one of skill in the art in possession of the present disclosure, the systems and methods of the present disclosure operate to detect whether any component in a computing device has been changed, whether the computing device has been tampered with, whether any component in the computing device is failing such as to render the computing device unsafe to enter a full-service runtime state and/or otherwise perform runtime operations, and/or whether an intercept device has been added to the computing device that may be configured to intercept data and maliciously redirect it to an external system, as well as perform corresponding quarantine action(s) during initialization (or during runtime operations) that either allow automated-control-plane-based policy remediation of the issue, or prevention of the operation of the computing device until the issue is remediated. As discussed below, such operations are enabled via the detailed measurements of components during initialization, as well as policies that define the severity of different inventory/functionality issues and how such issues should be quarantined and remediated.

As discussed above, the original/legacy BIOS that provides the firmware technology used to initialization a computing device has been progressively replaced with the UEFI "BIOS" that standardizes an interface between the operating system, operating system loaders, and the platform firmware, and provides a standardized alternative to the original/legacy BIOS. As will be appreciated by one of skill in the art in possession of the present disclosure, the UEFI "BIOS" is primarily concerned with initializing and booting a motherboard in the computing device, allowing loaders to find and load various operating systems over different hardware interfaces, and providing some "services" to the running operating system. Furthermore, the UEFI "BIOS" allows "secure boot" techniques to be utilized to establish a secure chain of trusted applications starting from the motherboard boot and ending in the loaded operating system. While various implementation of the UEFI specification has been developed, reference is made below to the open source implementation of UEFI "BIOS" available via the TianoCore Exchange Development Kit (EDK) II ("TianoCore" below).

The method 400 may begin at block 402 where a BIOS subsystem determines a current computing device component inventory of computing device components in a computing device during an initialization process, and then to block 404 where the BIOS subsystem measures current computing device functionality of the computing device components during the initialization process. In an embodiment, at block 402, the computing device 300 may be powered on, reset, and/or other initialized such that the BIOS engine 304 begins an initialization process for the computing device 300, which is followed by its determination of a current computing device component inventory of the computing device component(s) 310 in the computing device 300 during the initialization process, as well as its determination of current computing device functionality of the computing device component(s) 310 in the computing device 300 during the initialization process.

As will be appreciated by one of skill in the art in possession of the present disclosure, the UEFI boot handling process may be configured to generate detailed boot event log information and measurements. However, conventional implementations of such boot event log information and measurements are limited to storing that data in an EFI boot log for "after the event" forensic analytics that are manually/user driven. As such, while EFI tool chains are capable of reporting device status internal operation status into an event log, that data is not intended to proactively provide notification data for external consumption without a user manually querying the UEFI log data using external tools.

Figure 5:
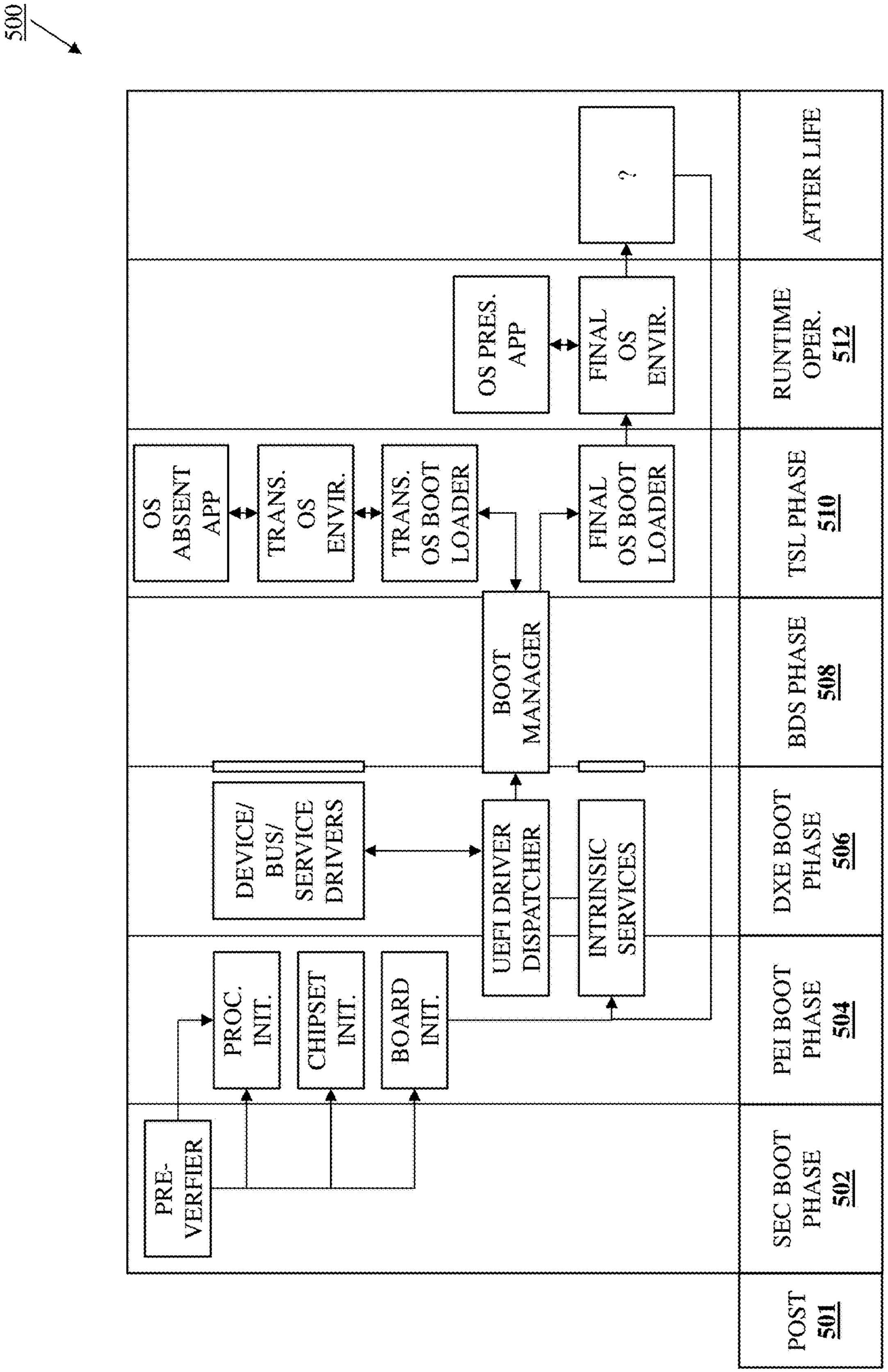
(Prior Art) FIG. 5
FIG. 5 is a schematic view illustrating an embodiment of a conventional UEFI boot process.

With reference to FIG. 5, an example of a conventional UEFI boot process 500 is illustrated, which begins with a Power On Self Test (POST) 501 that initiates a SECurity (SEC) boot phase 502 in which a root of trust is established and a Pre-EFI Initialization (PEI) boot phase 504 of the UEFI boot process 500 is verified. The SEC boot phase 502 is then followed by a PEI boot phase 504 then operates to initialize memory controllers, CPU interconnects, and other critical low level hardware, and when the PEI boot phase 504 is completed, the computing device 300 will be configured in a "long mode" with paging, and will be ready to execute C applications. The UEFI boot process 500 then enters a Direct execution Environment (DXE) boot phase 506 in which various buses are enumerated, other devices in the computing device 300 are initialized and their option Read-Only Memories (ROMs) executed, with all the drivers that are required to read the bootloader and the operating system files loaded during the DXE boot phase 506. Once all devices have been identified in the DXE boot phase 506, a Boot Device Select (BDS) phase 508 of the UEFI boot process 500 begins in which Non-Volatile Random Access Memory (NVRAM) variables are used to identify which disk, USB device, or network device should be used to load the OS bootloader, with a final OS bootloader executed from that device during a Transient System Load (TSL) phase 510 of the UEFI boot process 500 and used to initialize the "host" operating system and transfer control to it during runtime operations 512.

Figure 6:
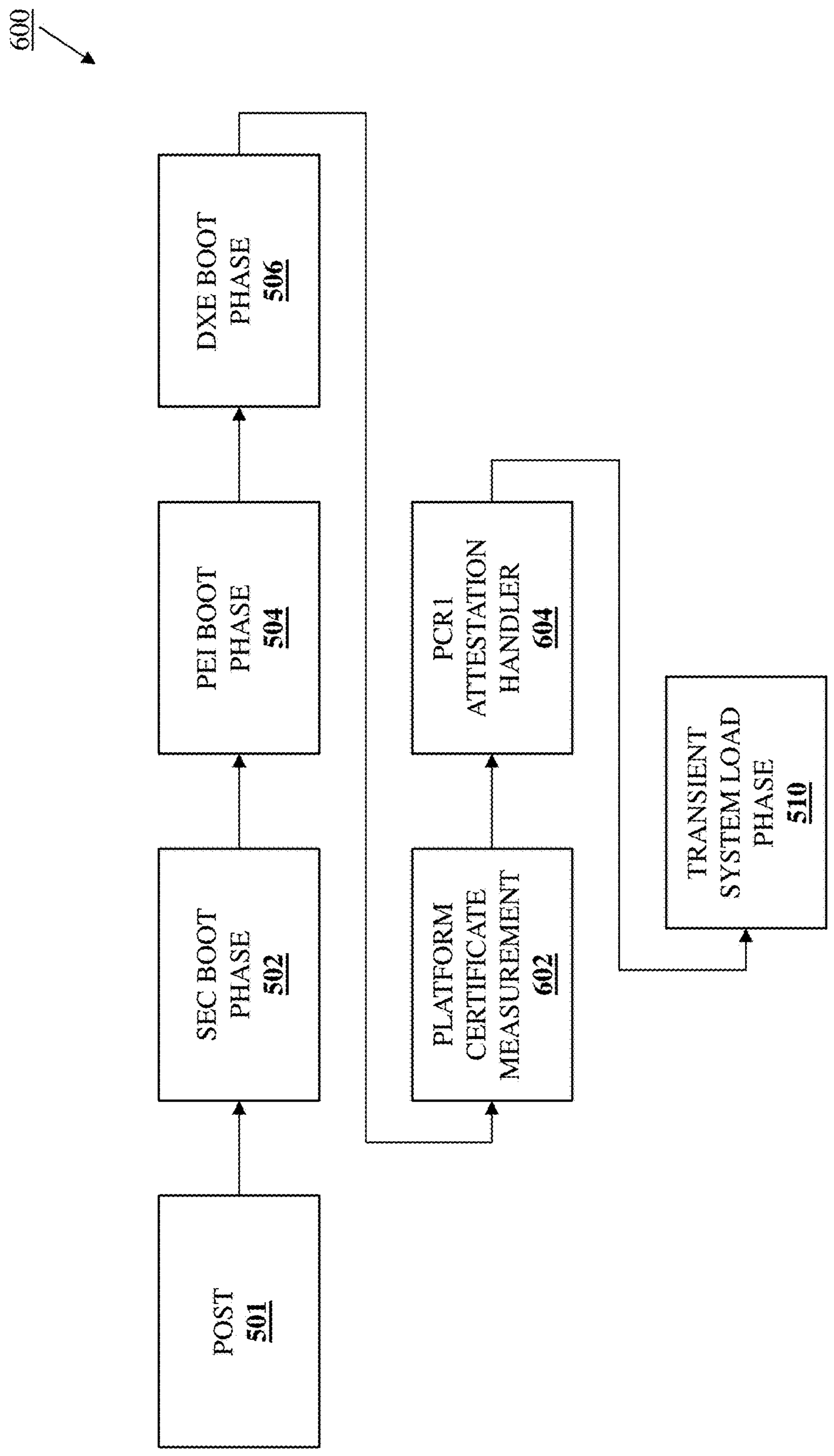
FIG. 6 is a schematic view illustrating an embodiment of a UEFI boot process that is provided according to the teachings of the present disclosure and that may be performed by the computing device of FIG. 3 during the method of FIG. 4.

With reference to FIG. 6, an embodiment of a UEFI boot process 600 that is provided according to the teachings of the present disclosure illustrates how the conventional UEFI boot process 500 discussed above with reference to FIG. 5 may be modified to perform a platform certificate measurement 602 and provide a PCR1 attestation handler 604 that are discussed in further detail below, with the illustrated embodiment providing for the platform certificate measurement 602 early in the boot flow after POST 501 and immediately following the DXE boot phase 506, and providing the PCR1 attestation handler 604 immediately prior to the TSL phase 510 in order to provide a relatively late-stage attestation procedure. As discussed below, in an embodiment, the BIOS engine 304 may operate to determine the current computing device component inventory of the computing device component(s) 310 in the computing device 300 via the platform certificate measurement 602 and/or the PCR1 attestation handler 604 at block 402, and may operate to determine the current computing device functionality of the computing device component(s) 310 in the computing device 300 via the PCR1 attestation handler 604 at block 404. Furthermore, as discussed in further detail below, in some embodiments a PCR7 attestation handler may also be provided in the runtime operating system as well in order to attest to secure boot operations.

With reference back to the TianoCore open source implementation of UEFI "BIOS", system firmware providing for conventional UEFI power-up and boot processes will operate to start a TPM device, synchronize Platform Configuration Register (PCR) banks in the TPM, perform a Core Root of Trust Measurement (CRTM), and measure a Firmware Volume (FV) during the PEI boot phase discussed above. The system firmware providing the conventional UEFI power-up and boot processes will then determine a secure boot policy, publish an Advanced Configuration and Power Interface (ACPI), install a Trusted Computing Group protocol (e.g., a TCG2 protocol), measure an option ROM, measure a boot variable, and measure an operating system loader during the DXE boot phase discussed above. During the loading of the OS loader, the conventional UEFI power-up and boot processes will then operate to measure an operating system kernel.

As will be appreciated by one of skill in the art in possession of the present disclosure, the determination of the current computing device component inventory of the computing device component(s) 310 in the computing device 300 by the BIOS engine 304 via the platform certificate measurement 602 at block 402 may include any of the measurements discussed above. In an embodiment, measurements performed during the platform certificate measurement 602 at block 402 and measurements made by the PCR1 attestation handler 604 at block 404 (discussed below) may be used to generate a current computing device inventory platform certificate (e.g., the Firmware Integrity Manifest (FIM) described herein), and that current computing device inventory platform certificate may then be stored in the TPM device 308. For example, at least some of the measurements included in the platform certificate measurement 602 may be performed as defined by the TPM Main Specification, Level 2, Version 1.2, Revision 103, which describes PCR1 operations that measure a component inventory of a computing device, and eventually generate a platform certificate.

As will be appreciated by one of skill in the art in possession of the present disclosure, block 402 of the method 400 may utilize an X.509 certificate generated by computing device manufacturers and vendors during the production (or computing device component assembly) of the computing device 300, which may provide a Reference Integrity Manifest (RIM) for the computing device 300 described herein. To provide a specific example, the Trust Computing Group (TCG) specification describes Platform Certificate Profiles (PCPs) that include component certificate identifiers that identify each computing device component (e.g., the computing device component(s) 310) in a computing device (e.g., the computing device 300), along with a Platform Certificate that may attest that the computing device includes a unique TPM device and a Trusted Building Block (TBB), and that may be utilized to verify the security properties and configuration of the computing device as shipped by a computing device manufacturer. Furthermore, one of skill in the art in possession of the present disclosure will appreciate that "Delta" Platform Certificates may be issued by integrators as the computing device 300 passes through the supply chain after the computing device 300 has been shipped from the computing device manufacturer on its way to a user. In addition to the Platform Certificates and the Delta Platform Certificates discussed above, a Privacy Certificate Authority (CA) may issue an Endorsement Key (EK) that may be used to assert that the platform includes a unique TPM to which the Platform Certificate makes reference.

As such, the chain of platform certificates associated with the computing device 300 may include a Platform Certificate generated by a platform manufacturer using a base certificate, a first Delta Platform Certificate generated by a system integrator using the base certificate, and a second Delta Platform Certificate generated by Value Added Reseller (VAR) using the base certificate. As will be appreciated by one of skill in the art in possession of the present disclosure, the issuance sequence of the platform certificates in the example above may be 1) Platform Certificate, 2) first Delta Platform Certificate, and 3) second Delta Platform Certificate, with the verification path of those platform certificates performed in a reverse order.

As will be appreciated by one of skill in the art in possession of the present disclosure, the platform-certificate-based computing device attestation provided by the platform certificates discussed above may be configured to measure the computing device components 310 that were assembled and installed in the computing device 300 by the computing device manufacturer, or that were added between the manufacture of the computing device 300 and its deployment at a user location. As such, the platform certificate measurement 602 performed by the BIOS engine 304 at block 402 and measurements made by the PCR1 attestation handler 604 at block 404 may be used to determine at least some of the current computing device component inventory of the computing device components 310 in the computing device 300 during the initialization process by retrieving manufacturer identification information from each of those computing device components 310. For example, at least some of the measurements made as part of the platform certificate measurement 602 and/or by the PCR1 attestation handler 604 may be defined by the TCG PC Client Platform Firmware Integrity Measurement, Version 1.0 Revision, Specification 43, Family 2.0, dated May 7, 2021, and thus may include a PCR0 measurement of firmware in the computing device 300, as well as a PCR1 measurement of the identity of the components in the computing device 300, in order to generate a FIM includes firmware measurements (i.e., PCR0 measurements) and component identity measurements (e.g., PCR1 measurements).

However, such platform-certificate-based computing device attestation does not provide a "full" platform integrity measurement capacity. For example, conventional platform certificate measurement operations (discussed in further detail below) may correctly identify a memory device by its manufacturer identification information and verify that memory device via a corresponding computing device component certificate provided by the RIM discussed above (e.g., by matching the management identification information to the computing device certificate), but will not be capable of determining any extent to which that computing device component may be failing. To provide a specific example, as discussed below, a memory device with 16 GB of storage capacity may be measured during the initialization process to currently only be capable of providing 12 GB of storage capacity, which could impact the integrity of the memory device and/or the computing device 300 as a whole, and as discussed above justify quarantine/remedial actions. As such, the PCR1 attestation handler 604 provided according to the teachings of the present disclosure operates to perform measurements that provide for the identification of such "functionality drifts" in computing device components as well.

Thus, the platform certificate measurement 602 and PCR1 attestation handler 604 may provide for the identification of the computing device components 310, with the self-identity of each computing device component 310 and the computing device component certificate used in the certification process of each computing device component 310 (e.g., provided by the RIM discussed above). In some embodiments, the platform certificate "measurements" may include performing a hashing algorithm on various computing device component(s) 310 associated with the boot process to generate corresponding hash values, extending data (e.g., the FIM discussed above) stored in the TPM device 308 with the generated hash values (discussed below), logging the computing device component measurements in a measurement log in the memory system of the computing device 300, as well as any other platform certificate measurement operations that would be apparent to one of skill in the art in possession of the present disclosure. As will be appreciated by one of skill in the art in possession of the present disclosure, specific computing device components upon which platform certificate measurements are made to generate the FIM, the order those platform certificate measurements, and storage locations of those platform certificate measurements may be performed as is specified in the TCG PC Client Platform Firmware Profile Specification.

Furthermore, as the TPM device 308 will typically be provided by a discrete chip that runs at a lower clock speed than the CPU in the computing device 300 and that is connected to the rest of the computing device components 310 in the computing device 300 via a relatively slow bus, interaction with the TPM device 308 may produce a platform "bottleneck" during the boot process. As such, the amount of data sent to the TPM device 308 for measurement may be minimized and, once an initial measurement has been made, the CPU in the computing device 300 may be utilized to execute hash algorithms in order to perform hash operations on relatively large amounts of data. For example, the platform certificate measurement 602 and/or measurements made by the PCR1 attestation handler 604 may include the CPU performing such hash calculations on all of the auxiliary components that come out of remote access controller/Baseboard Management Controller (BMC) firmware, Field Programmable Gate Array (FPGA) firmware, and Complex Programmable Logic Device (CPLD) firmware in order to generate the FIM.

With regard to the determination of the current computing device component inventory and current computing device functionality of the computing device component(s) 310 in the computing device 300 by the BIOS engine 304 via the PCR1 attestation handler 604 at blocks 402 and 404, the TPM device 308 includes memory locations that are referred to as Platform Configuration Registers (PCRs) that store reference computing device component inventory values for the computing device components 310 that provide a reference computing device component inventory for the computing device 300. In a specific example, the computing device components measured by the PCR1 attestation handler 604 may those identified in the SMBIOS-based Component Class Registry, Version 1, Revision 01, dated Feb. 18, 2021. As will be appreciated by one of skill in the art in possession of the present disclosure, the size of the value that may be stored in a PCR is determined by the size of a digest generated by the hash algorithm that is used. For example, a Simple Hash Algorithm 1 (SHA-1) hash-algorithm-based PCR can store 20 bytes (i.e., the size of the SHA-1 digest). Furthermore, multiple PCRs associated with the same hash algorithm may be referred to as the "PCR bank" discussed above.

As will be appreciated by one of skill in the art in possession of the present disclosure, an "existing" PCR value ("PCR (existing)" in the example below) may be "extended" ("PCR (new)") by the following operation:

$$PCR(\text{new}) = HASH(PCR(\text{existing}) \| HASH(\text{data}))$$

where "HASH" is a hash algorithm, "data" is the new data used to generate the extension of the old PCR value, and "||" is a catenation of the old PCR value and the new data.

The resulting concatenation is then used as input to the associated hashing algorithm, which computes a digest of the input, and the digest becomes the new value for the PCR. The TCG PC Client Platform TPM Profile Specification defines the inclusion of at least one PCR bank with 24 registers, and the only way to reset the first 16 PCRs is by resetting the TPM device itself (e.g., to ensure that the values of those PCRs can only be modified via the TPM extend operation discussed above). Conventionally, some TPM PCRs are used as checksums of log events, with the log events extended in the TPM PCRs as the events occur so that an auditor may later validate the logs by computing the expected PCR values from the log and comparing those to the PCR values in the TPM. With modification of the first 16 PCRs in the TPM restricted as discussed above, a match between an expected PCR value in that range and the actual TPM PCR value providing an assurance of an unmodified log.

Furthermore, the PCR1 domain is defined in the TCG Server Management Domain Firmware Profile Specification (e.g., "PCR Index 1") as including 1) the boot variable, System Management BIOS (SMBIOS) table, ACPI table, microcode, and platform configuration in the system firmware of the computing device 300 (also known as the host platform configuration and management domain configuration/boot integrity status); 2) the chassis and table of devices in the hardware of the computing device 300; and in some cases 3) the configuration in nonhost firmware in the computing device 300. In a specific example, a PCR1 certificate composition collation process may include a host component check list, a Boot Integrity Status (BIS) checklist (e.g., firmware validation operations), SMBIOS components (e.g., serial number and identifier mismatches), an Extended System Configuration Data (ESCD) component list (e.g., identifier mismatches), and Universal Serial Bus (USB) port measures (e.g., all ports off).

As such, some embodiments of the PCR1 attestation handler 604 may operate to measure Boot Integrity Services (BIS), the ACPI, and SMBIOS information, as well as Extended System Configuration Data for Plug-and-Play services. In addition, "deep-state" inspection of computing device components by the PCR1 attestation handler 604 may include the use of Linux tools such as acpidump, acpixtract, dmidecode, lsusb, lspci, iasl, lshw, lmsensors, efivars, and the TPM2 toolset to gather data from the processing system databases, memory system databases, and/or other computing device component databases in the computing device 300. As will be appreciated by one of skill in the art in possession of the present disclosure, such tools may be utilized to identify the presence of host devices and their unique identification data, as well as to identify their expected functionality and current functionality, and offer "deep-state" inspection of hardware and software components in the computing device 300 that allow for the identification of data that is not available via the qualitative values provided by the platform configuration profile measurements discussed above. As described below, these "deep-state" measurements may be used as part of the systems and methods of the present disclosure to uniquely fingerprint the integrity of the computing device components 310 (e.g., as determined by the difference between their expected functionality and current functionality), and allow the PCR1 attestation handler 604 to be used as the triggering mechanism to indicate a system status that may require the quarantine action(s) that are discussed in further detail below, which may be tied to policy-driven assessments of the degree of severity of drift from a reference that may have been hashed, encrypted, and stored in the TPM device 308 during the manufacture of the computing device 300, as discussed above.

In a specific example, the PCR1 attestation handler 604 may be configured to generate a Private/Public Key Pair (PKCS) X.509 signed certificate that may be stored within the TPM2 secure value, and that may operate as the RIM for the computing device 300 (which is a technique specified by the TCG) against which measurements may be compared during the initialization of the computing device 300, discussed in further detail below. Furthermore, one of skill in the art in possession of the present disclosure will recognize how runtime comparisons may be performed by following (in principle) guidelines provided by the TCP PC Client Platform Firmware Integrity Measurement process.

As such, the PCR1 attestation handler 604 may operate to measure the consistency of PCR1 between the DXE boot phase 506 and TSL phase 510 discussed above, as well as to reconstruct events via reading of the event log. As discussed below, a UEFI policy handler may then be configured to detect and report any tampering or deterioration associated with the computing device 300 to an automated control plane/orchestrator so that quarantine actions and possible remediation/mitigation of that tampering or deterioration.

The method 400 then proceeds to block 406 where the BIOS subsystem measures initialization metrics during the initialization process. In an embodiment, at block 406, the BIOS engine 304 may operate measure initialization metrics during the initialization process. As will be appreciated by one of skill in the art in possession of the present disclosure, once an operating system has been installed and booted in the computing device 300, it is desirable to attest to the integrity of the overall boot process, and a PCR7 attestation handler may be implemented by the BIOS engine 304 (along with other host operating system tools) in order to validate the foundations of the trustworthiness of the computing device 300 following its initialization process discussed above.

Figure 7:
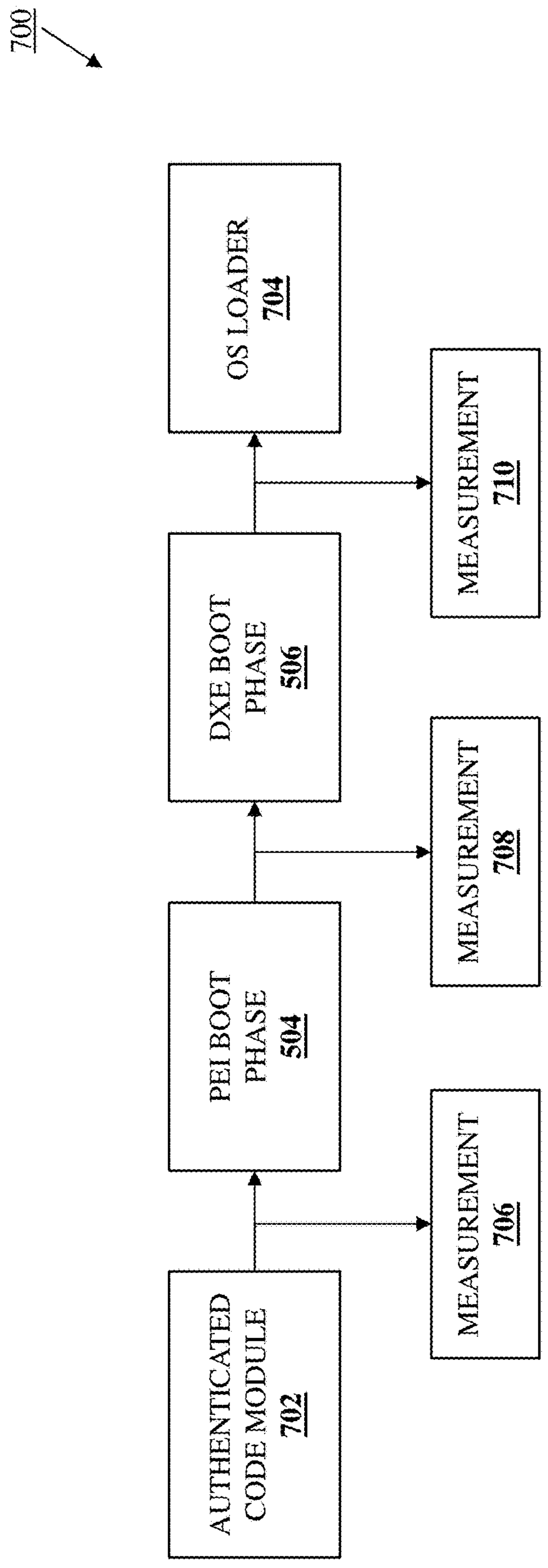
FIG. 7 is a schematic view illustrating an embodiment of a trusted boot flow 00 that may be performed by the computing device of FIG. 3 during the method of FIG. 4.

The handling of the PCR7 register within firmware during the UEFI boot process is described in the Tianocore Trusted Boot Chain documentation referenced above, and is described as providing current integrity data that is generated during initialization operations and that may be used with other runtime host operating system tools to measure a departure from reference integrity measurements. For example, FIG. 7 illustrates a trusted boot flow 700 that proceeds from an Authenticated Code Module (ACM) 702 (e.g., provided by the CPU in the computing device 300) to the PEI boot phase 504 discussed above, then to the DXE boot phase 506 discussed above, and then to an operating system loader 704 that may be provided in the TSL phase 510 discussed above. As can be seen, measurement(s) 706 may be made before the transition from the ACM 702 to the PEI boot phase 504, measurement(s) 708 may be made before the transition from the PEI boot phase 504 to the DXE boot phase 506, and measurement(s) 710 may be made before the transition from the DXE boot phase 506 to the OS loader 704.

As would be appreciated by one of skill in the art in possession of the present disclosure, "secure/verified" boot operations may operate in firmware and may utilize a set of policy objects to verify the next entity before execution (e.g., the BIOS engine 304 may use a verification procedure to verify an untrusted firmware component and, if verified, transform the untrusted firmware component to a trusted firmware component and execute the trusted firmware component, while preventing the execution of an untrusted firmware component that cannot be verified). To contrast, "trusted/measured" boot operations may not operate to verify the next entity before executing it during the initialization process, and rather may only record the measurement(s) discussed above to a trusted location (e.g., a PCR in the TPM), which allows a trusted boot chain to be verified later in the boot process. As will be appreciated by one of skill in the art in possession of the present disclosure, in some embodiments, the computing device 300 may implement security models utilizing both the secure/verified boot and trusted/measured boot capabilities discussed above in combination to maximize boot security. As such, as discussed below, the computing device 300 may be configured to identify a secure boot violation and either halt the boot process prior to entering runtime operations for the computing device 300, or allow the boot process to proceed, and determine how to deal with the secure boot violation during runtime operations for the computing device 300 (based on the policy-driven severity level quarantine/remediation action(s) discussed below).

As will be appreciated by one of skill in the art in possession of the present disclosure, UEFI Secure Boot is a feature defined in the UEFI Specification, and operates to guarantee that only valid third party firmware code may run in the Original Equipment Manufacturer (OEM) firmware environment. UEFI Secure Boot assumes that the system firmware is a trusted entity, while any third party firmware code is not trusted (including the bootloader installed by the operating system vendor, as well as peripherals provided by an Independent Hardware Vendor IHV)). However, a user of the computing device 300 may choose to enroll and remove entries in the UEFI Secure Boot image security database as part of managing the verification policy.

UEFI Secure Boot includes two parts: 1) verification of the boot image, and 2) verification of updates to the image security database. PCR7 is utilized to validate if a policy is violated based on all variables associated with the computing device, and measures the security configuration (if present), the security authority (if present), and security feature disabling events (e.g., "UEFI Debug Mode", "DMA protection disabled", etc.). In conventional UEFI Secure Boot operations, criteria for these measurements are pass/fail, with the computing device halting the boot process in the event of a fail.

As will be appreciated by one of skill in the art in possession of the present disclosure, the consistency of the host operating system may be verified using Integrity Measurement Architecture (IMA) and Extended Verification Modules (EVM), which are capable of operating on platforms without a hardware TPM (but without the hardware guarantee of compromise detection). For example, IMA enables the performance of integrity functions such as a collection function that measures a file before it is accessed, a storage function that adds measurements to a kernel resident list and extends the PCR for the IMA if a hardware TPM device is present, an attestation function that uses the TPM to sign the PCR value for the IMA in order to allow for remote validation of the measurement list, an appraisal function that enforces local validation of a measurement against a "good" value (an "appraisal hash value") stored in an extended attribute of a file, a protection function that protects file security extended attributes (including the appraisal hash discussed above) against off-line attack, and an auditing function that audits the file hashes.

As will be appreciated by one of skill in the art in possession of the present disclosure, the IMA operations discussed above (which are one component of the integrity subsystem for the kernel) are part of an overall integrity architecture that is based on TCG open standards and that includes the TPM, Trusted Boot, the Trusted Software Stack (TSS), the Trusted Network Connect (TNC), and Platform Trusted Services (PTS). Furthermore, one of skill in the art in possession of the present disclosure will appreciate that TPM errors may occur, and the TCG specification suggests they be dealt with by notifying the computing device administrator, user, and/or operator, while transitioning to a fail-safe mode via either making the TPM inaccessible via hardware for the remainder of the power cycle, rebooting the computing device, or disabling the computing device.

As discussed further below, measurements made by the PCR7 attestation handler to perform the trusted/measured boot operations discussed above may be used to determine the Quarantine Action Metric (QAM) discussed below during both initialization and at runtime of the computing device 300, and may result in the performance of one or more quarantine actions during both initialization and at runtime of the computing device 300, discussed in further below as well. For example, the QAM tables discussed below may include entries for secure boot measurements, and may be utilized similarly as discussed below to identify issues with secure boot identified during boot or at runtime of the computing device 300, allowing for the performance of corresponding quarantine and/or remediation action(s) during boot or at runtime of the computing device 300.

The method 400 then proceeds to decision block 408 where it is determined whether a computing device change has been identified. In an embodiment, at decision block 408, the BIOS engine 304 may determine whether a computing device change has been identified as a result of a change between any of a reference computing device component inventory and the current computing device component inventory determined at block 402, reference computing device functionalities and the current computing device component functionalities determined for each of the plurality of computing device components at block 404, or any of the initialization metrics measured at block 406. As discussed above, the current computing device component inventory identified as part of the platform certificate measurements 602 at block 402 and/or by the PCR1 attestation handler 604 at block 404 may be compared against the platform/component device component certificates, the current computing device component functionalities identified by the PCR1 attestation handler 604 at block 404 may be compared against the PCRs in the TPM device 308, and the initialization metrics identified by the PCR7 attestation handler at block 406 may be compared against the PCRs in the TPM device 308 in order to identify whether a computing device change associated with the computing device 300 has occurred. Furthermore, as described in further detail in the specific examples provided below, computing device changes may be identified at decision block 408 via a QAM bitfield in a QAM table.

If, at decision block 406, it is determined that no computing device change has been identified, the method 400 proceeds to block 410 where the BIOS subsystem completes the initialization process such that the computing device enters a runtime state. As will be appreciated by one of skill in the art in possession of the present disclosure, in the event that the current computing device component inventory determined at block 402 (e.g., as identified in the FIM discussed above) matches the reference computing device component inventory (e.g., as identified in the RIM discussed above), the current computing device component functionalities determined for each of the plurality of computing device components at block 404 match reference computing device functionalities, and the initialization metrics measured at block 406 have not changed, at block 410 the BIOS engine 304 may complete the initialization process for the computing device 300 such that the computing device enters the runtime state and performs runtime operations 512 as discussed above with reference to FIG. 5. In other words, if the current state of the computing device 300 is the same as a last-known safe/factory state of the computing device 300 (i.e., the current inventory of the computing device 300 matches a reference inventory, the current functionality of all of the computing device components matches their reference functionalities, and the initialization process (e.g., a trusted/measured boot process) completed as configured), the computing device 300 will be allowed to enter a runtime state such that it is controlled by its operating system.

If at decision block 406, it is determined that a computing device change has been identified, the method 400 proceeds to block 412 where the BIOS subsystem generates a Quarantine Action Metric (QAM) based on the computing device change. In an embodiment, at block 412, the BIOS engine 304 may utilize any of the differences between the current state of the computing device 300 and a last-known good state of the computing device 300 (i.e., differences between the current inventory of the computing device 300 and a reference inventory, any of the differences between the current functionality of all of the computing device components and their reference functionalities, and/or any irregularities with the initialization process (e.g., a trusted/measured boot process)), to generate a QAM.

Figure 8:
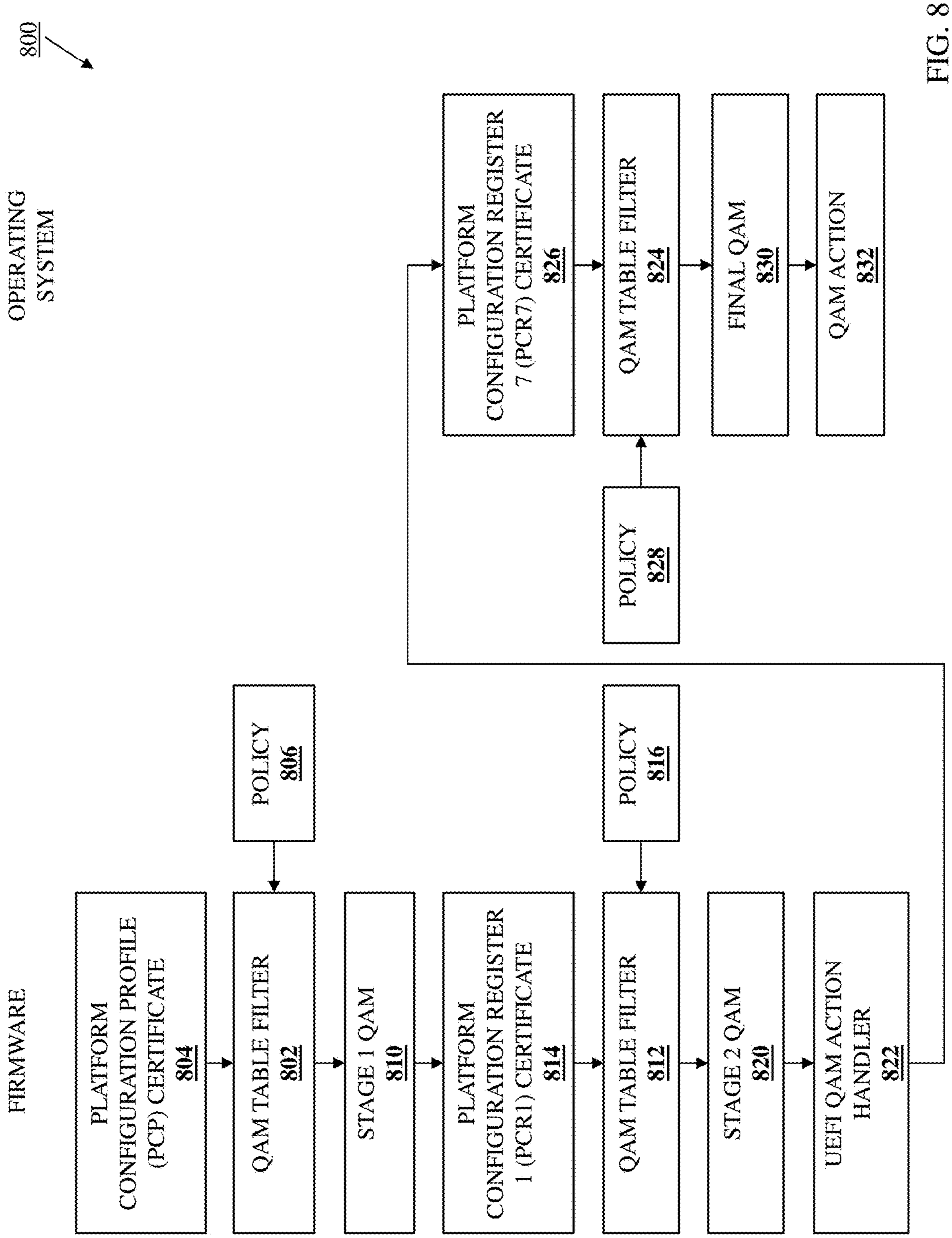
FIG. 8 is a schematic view illustrating an embodiment of a QAM generation process that is provided according to the teachings of the present disclosure and that may be performed by the computing device of FIG. 3 during the method of FIG. 4.

With reference to FIG. 8, an embodiment of a QAM generation process 800 is illustrated that may be performed at blocks 408 and 412. As can be seen, the QAM generation process 800 illustrated separates the QAM generation sub-processes and/or components that operate in firmware and during the initialization process for the computing device 300, and the QAM generation sub-processes and/or components that operate in the operating system of the computing device 300 following initialization. The QAM generation process 800 may begin with a QAM table filter process 802 (discussed in further detail below) that utilizes a Platform Configuration Profile (PCP) certificate (e.g., generated via the platform certificate measurement 602 discussed above) and a policy 806 that may have been provided by the computing device manufacturer and stored in a memory system in the computing device 300. For example, the policy 806 may provide the severity tables that provide for the severity filtering discussed below, and may be set via a control plane such that it persists between reboots of the computing device 300 to provide a "hard-coded" policy. As illustrated, the QAM table filter process 802 may output a stage 1 QAM 810 that may be provided by the QAM bitfield discussed below, and that is associated with quarantine actions that should be performed in response to the computing device changes identified at decision block 406. As discussed above, in some embodiments, the stage 1 QAM 810 may be generated based on the initialization metrics identified as discussed above with reference to block 406 (e.g., as part of the secure boot operations) while remaining within the scope of the present disclosure as well. As will be appreciated by one of skill in the art in possession of the present disclosure, in some examples the stage 1 QAM 810 may provide a corresponding severity that results in the UEFI QAM action handler discussed below performing a quarantine action that may include, for example, halting the initialization of the computing device 300 (e.g., when a computing inventory change or secure boot issue is categorized as "CRITICAL-1" in the example below).

With continued reference to FIG. 8, the QAM generation process 800 may proceed with a QAM table filter process 814 (discussed in further detail below) that utilizes a Platform Configuration Register 1 (PCR1) certificate (e.g., generated via the PCR1 attestation handler 604 discussed above) and a policy 816 that may have been provided by the computing device manufacturer and stored in a memory system in the computing device 300. For example, the policy 816 may provide the severity tables that provide for the severity filtering discussed below, and may be set via a control plane such that it persists between reboots of the computing device 300 to provide a "hard-coded" policy. As illustrated, the QAM table filter process 812 may output a stage 2 QAM 820 that modifies the stage 1 QAM 810 and that may also be provided by the QAM bitfield discussed below, and that is associated with quarantine actions that should be performed in response to the computing device changes identified at decision block 406. As discussed above, in some embodiments, the stage 2 QAM 820 may be generated based on the initialization metrics identified as discussed above with reference to block 406 (e.g., as part of the secure boot operations) while remaining within the scope of the present disclosure as well. As will be appreciated by one of skill in the art in possession of the present disclosure, in some examples the stage 2 QAM 820 may provide a corresponding severity that results in the UEFI QAM action handler discussed below performing a quarantine action that may include, for example, halting the initialization of the computing device 300 (e.g., when a computing inventory change, computing device component functionality change, "deep-state" inspection change, and/or secure boot issue is categorized as "CRITICAL-1" in the example below).

With reference to FIGS. 9A and 9B, an embodiment of a QAM table 900 and corresponding severity table 902 that may be used in the QAM table filter processes 802 and 812 is illustrated. In the illustrated embodiment, the QAM table 900 identifies a plurality of computing device components (e.g., memory modules, a CPU, USB hubs, PCIe sockets, sensors, voltage rails, disk drives, and a chassis tamper detect subsystem), and includes a QAM bitfield that provides an identifier flag ("ID OK") and a function flag ("F(n) OK") in association with each computing device component. However, while a simplified example is provided in FIGS. 9A and 9B that include only physical computing device components, as discussed above the QAM table 900 may include entries and corresponding QAM bitfield portions for firmware components, secure boot components, and/or any other computing device component for which the measurements discussed above are made.

As will be appreciated by one of skill in the art in possession of the present disclosure, the QAM bitfield provided in the QAM table 900 may be populated with respective identifier flags and/or functionality flags for each computing device component for which a measurement is made during the method 400. In the event an identifier (determined at block 402) or functionality (determined at block 404) results in a computing device change (determined at block 408), corresponding flags may be set in the QAM bitfield. As discussed in further detail below, the severity table 902 for the QAM table 900 may include a plurality of severity levels (e.g., "CRITICAL-1", "CRITICAL-2", "CRITICAL-3", "WARNING-1", and "WARNING-2" in the example below), with those severity levels based on the policies 806, 816, and/or 828 discussed above.

The specific example illustrated in FIG. 9B provides a scenario in which a flag (a change from false/"0" in FIG. 9A to true/"1" in FIG. 9B) is set for the memory modules due to the current functionality of the memory modules not matching a reference functionality at block 404, and a flag (a change from false/"0" in FIG. 9A to true/"1" in FIG. 9B) is set for the PCIe sockets due to the current identifier of a PCIe card in a PCIe socket not matching a reference identifier for allowable PCIe cards at block 402. Furthermore, FIG. 9B illustrates how the severity table 902 for the QAM table 900 includes a severity flag set for the "CRITICAL-1" severity level corresponding to the flag set for the memory modules due to the current functionality of the memory modules not matching a reference functionality, and includes a severity flag set for the "CRITICAL-1" severity level corresponding to the flag set for the PCIe sockets due to the current identifier of a PCIe card in a PCIe socket not matching a reference identifier for allowable PCIe cards, both of which may be provided by the policies 806, 816, and/or 828 as discussed above.

As will be appreciated by one of skill in the art in possession of the present disclosure, the flags set in the QAM bitfield (e.g., as illustrated in FIG. 9B) may provide a QAM value that is based on those set flags (e.g., the stage 1 QAM 810 and the stage 2 QAM 820 discussed above). Continuing with the example provided above, the polic(ies) discussed above may provide the severity table 902 that translates the QAM bitfield into a QAM value that may be associated with quarantine action(s) that should be taken when memory module functionality has changed and an unauthorized PCIe card is provided in a PCIe socket. As discussed above, in the event the measured memory capacity of the memory modules does not match their reference memory capacity that may indicate that a memory module is failing or may be defective (resulting in the setting of its functionality flag as illustrated in FIG. 9B), and given that potentially defective memory modules could render the computing device 300 unstable or inoperative, a relatively high QAM (e.g., associated with "critical-1" severity level, discussed in further detail below) may be generated and associated quarantine actions taken. Similarly, in the event identifier of a PCIe card connected to a PCIe socket does not match identifiers for allowed PCIe cards (resulting in the setting of its identity flag as illustrated in FIG. 9B), and given such a situation presents a security issue with the computing device 300, a relatively high QAM (e.g., associated with "critical-2" severity level, discussed in further detail below) may be generated and associated quarantine actions taken.

In another (non-illustrated) embodiment, chassis tamper detection subsystems (when available in the computing device 300) may be utilized to measure physical device tampering activities via techniques such as electronically activated switch mechanisms, gravitational force measurements, shock detection, and/or other chassis tamper detection techniques that would be apparent to one of skill in the art in possession of the present disclosure. Furthermore, one of skill in the art in possession of the present disclosure will appreciate how the QAM bitfield may be populated based on any measurements taken as discussed above (e.g., the "deep-state" inspection measurements, secure boot measurements, and/or other measurements discussed above), and utilized similarly in a QAM bitfield as discussed above to generate the QAM.

One of skill in the art in possession of the present disclosure in the art in possession of the present disclosure will appreciate how the QAM bitfield in the QAM table 900 may vary depending on the configuration and computing device components in the computing device 300, but a standard method of representation with the QAM bitfield may be useful, and could be the subject of a defined industry standard in the future.

With continued reference to FIG. 8, the QAM generation process 800 may proceed with a UEFI QAM action handler 822 that may perform (via firmware) the quarantine action(s) discussed below prior to entering the runtime operations 512 discussed above with reference to FIG. 5. However, while a "UEFI" QAM action handler is described, one of skill in the art in possession of the present disclosure will recognize how the UEFI QAM action handler described herein may be replaced using a hard code "trap" in the processing code in order to perform similar functionality while remaining within the scope of the present disclosure as well.

Prior to discussion of possible quarantine action(s) that may be performed either prior to the runtime operations 512 or during the runtime operations 512, and with continued reference to FIG. 8, the QAM generation process 800 may proceed with a QAM table filter process 824 (which is performed similarly as the QAM table filter processes 802 and 812 discussed above)) that utilizes a Platform Configuration Register 7 (PCR7) certificate (e.g., generated via the PCR7 attestation handler discussed above) 826 and a policy 828 that may have been provided by the administrator or other user of the computing device 300 and stored in a memory system in the computing device 300. As illustrated, the QAM table filter process 824 may output a final QAM 820 that modifies the stage 2 QAM and that may also be provided by a QAM bitfield that is associated with quarantine actions that should be performed in response to the computing device changes identified at decision block 406 (e.g., a secure boot issue in the examples above), with the final QAM 832 utilized to perform a QAM action 832, discussed in further detail below.

The method 400 then proceeds to block 414 where the BIOS subsystem performs quarantine action(s) associated with the computing device based on the QAM. In an embodiment, at block 414, the BIOS engine 304 may then perform one or more quarantine actions based on the QAM generated at block 412, with the quarantine action(s) performed based on the policies discussed above that determine a severity level of the computing device change discussed above, and performed during the initialization process (e.g., by the UEFI QAM action handler 822 using the stage 1 QAM 810 or stage 2 QAM 820 discussed above) or during runtime operations 512 for the computing device. In one example, the quarantine action(s) performed based on the QAM may include halting the initialization process of the computing device 300 to prevent transition of the computing device 300 to a runtime state in which the runtime operations 512 discussed above are performed. As such, some computing device changes may result in the generation of a QAM that is associated with a relatively high severity level that requires the initialization of the computing device 300 to be stopped.

In yet another example, the quarantine action(s) performed based on the QAM may include reconfiguring the computing device 300 to provide the computing device in a previous state in which no computing device changes were identified relative to the reference computing device component inventory and the reference computing device functionalities. For example, in response to the example above in which the initialization process for the computing device 300 is halted, the QAM that is associated with the relatively high severity level may also require reversion of that computing device to a last known safe/factory state.

In another example, the quarantine action(s) performed based on the QAM may include providing information that describes the at least one computing device change for display on a display device coupled to the computing device 300, and requesting authorization to proceed with the initialization process. As such, some computing device changes may result in the generation of a QAM that is associated with an intermediate severity level that requires contact with an automated orchestrator (e.g., through via the management device 206 through the network 204) and subsequent authorization to proceed with the initialization process. However, one of skill in the art in possession of the present disclosure will appreciate that the policy 828 may allow an automated orchestrator to modify such operations to automatically revert that computing device to a last known safe/factory state rather than pause initialization of that computing device until the automated orchestrator is available to authorize the current initialization process to proceed.

Furthermore, in the event authorization is received to proceed with the initialization process in the example above, the at least one of the reference computing device component inventory and the reference computing device functionalities may be modified to include the at least one of the current computing device component inventory and the current computing device component functionalities that provided the at least one computing device change. As such, quarantine actions performed based on a QAM may result in "renormalization" of the computing device by updating the Reference Integrity Manifest (RIM) for the computing device with the current computing device component inventory (e.g., as identified in the Firmware Integrity Manifest (FIM) discussed above) and/or computing device functionalities in order to, for example, authorize the addition of a new computing device component to a computing device, authorize the operation of a computing device with a partially functional computing device component, etc.

As discussed above, some computing devices (e.g., the edge computing devices discussed above) may be placed in publicly accessible areas (e.g., a factory floor) that require that Out Of Band (OOB)/Baseboard Management Controller (BMC) network be disabled (e.g., for safety reasons). As such, conventional remediation techniques that utilize remote direct access (e.g., via a BMC in the computing device) for interactive human corrective response technique may be unavailable, and the automated quarantine action and remediation operations discussed above may provide substantial benefits.

As will be appreciated by one of skill in the art in possession of the present disclosure, while platform-certificate-based methods of supply chain validation provide a means for measuring deviation from the last known good platform configuration (e.g., by comparing measurements against a prior reference), conventional computing devices require human interaction for remediating any measured deviations, Furthermore, conventional platform certification processes are not configured for devices that are located where there are no human interventionists (e.g., Information Technology (IT) specialists or other informed persons), no keyboards, no monitors, and intermittent network connectivity (as is often present with the edge computing devices discussed above). As will be appreciate by one of skill in the art in possession of the present disclosure, the QAM generation techniques discussed above extend use of platform-certificate-based methods discussed above to determine a severity of deviation from a reference state, and the use that determined deviation to identify a quarantine status (defined as a QAM herein) that is then used to determine appropriate quarantine actions to perform. As such, the QAM determined for any computing device provides an indication of a level that computing device is out of compliance with a known safe/factory reference state, as well as the viability of the device from a trust, integrity, and security perspective, which allows the quarantine actions discussed above to be determined.

As illustrated and discussed with reference to FIG. 8, the QAM may initially be generated and updated (i.e., the stage 1 QAM and the stage 2 QAM) within the UEFI firmware (e.g., via the platform certificate measurement 602 performed at block 402 and the PCR1 attestation handler 604 provided at block 404), and then updated and finalized (e.g., the final QAM 830) when the simple boot flag and NVRAM contents are analyzed during secure boot operations. As discussed above, the value of the QAM may be provided by a QAM composite value that be associated with a degree of criticality, and that degree of criticality may warrant quarantine actions (e.g., based on the policies 806 and 816) prior to admission of the boot flow to an installed host OS (with any quarantine action required during boot handled by an automated System Update Handler that may be provided as part of a UEFI MicroOS-based firmware extension based on the teachings of the present disclosure, and that may interact with an automated control plane/orchestrator to remediate any quarantine state), or quarantine actions (e.g., based on the policy 828) subsequent to admission of the boot flow to the installed host OS.

To provide a specific example of how quarantine actions may be performed based on the QAM, an example of a QAM/quarantine action table is provided below:

| SEVERITY | POLICY ACTION | REMEDIATION |
|---|---|---|
| CRITICAL-1 | HALT SYSTEM | PHYSICAL REMEDIATION ACTION/HANDS-ON INTERVENTION |
| CRITICAL-2 | PASS TO SYSTEM UPDATE HANDLER AND REPORT TO CONTROL PLANE | WAIT FOR CONTROL PLANE INSTRUCTION, POSSIBLE HANDS-ON INTERVENTION |
| CRITICAL-3 | PASS TO SYSTEM UPDATE HANDLER AND REPORT TO CONTROL PLANE | WAIT FOR CONTROL PLANE INSTRUCTION, CONTINUE BOOT IF SAFE, POSSIBLE RENORMALIZATION |
| WARNING-1 | INVENTION REQUIRED | WAIT FOR CONTROL PLANE INSTRUCTION, CONTINUE BOOT IF SAFE |
| WARNING-2 | NOTIFY ONLY | REPORT TO CONTROL PLANE, CONTINUE BOOT |

As can be seen in the QAM/quarantine action table, a severity level of "critical-1", which is the most severe deviation in this example, may require the system to be halted (e.g., halting of the initialization of the computing device 300), as well as physical remediation actions/hands-on intervention if possible. However, other QAMs/severity levels may be safe enough to boot the host OS, and may be passed to the host OS environment for action that may be driven by the policy 828. In the specific example above, a severity level of "critical-2" may pass control to the automated system update handler discussed above, which may report the QAM to an automated control plane/orchestrator and wait for subsequent instruction (which may require hands-on remediation. In the specific example above, a severity level of "critical-3" may pass control to the automated system update handler discussed above, which may report the QAM to an automated control plane/orchestrator, and continue the boot operations if safe to do so (while possibly performing renormalization (e.g., by renormalizing the reference measurements discussed above with the current measurements discussed above)).

In the specific example above, a severity level of "warning-1" may require intervention, and may report the QAM to an automated control plane/orchestrator, and continue the boot operations if safe to do so. In the specific example above, a severity level of "warning-2" may require result in notifications only, and may continue the boot operations. However, while a specific QAM/quarantine action table has been provided, one of skill in the art in possession of the present disclosure will appreciate how a control plane administrator may set any of the policies 806, 816, and/or 828 discussed above in order to define how each severity state (e.g., "CRITICAL-1", "CRITICAL-2", "CRITICAL-3", "WARNING-1", and "WARNING-2" in the example above) should translate to quarantine action(s) and remediation action(s), with the QAM/quarantine action table above providing only a few examples of such quarantine action(s) and remediation action(s). As can be seen in FIGS. 9A and 9B, the severity levels identified in both the QAM/quarantine action table above and severity table 902 may be mapped to the measured changes identified in the QAM table 900.

Thus, systems and methods have been described that provide for the identification of any changes to computing device components in a computing device via the use of computing device component measurements performed during initialization of the computing device, as well as the generation of a Quarantine Action Metric (QAM) based on those changes, and the performance of corresponding quarantine action(s) based on the QAM. For example, the computing device quarantine action system of the present disclosure may include a computing device having a plurality of computing device components and a Basic Input/Output System (BIOS) subsystem. During an initialization process, the BIOS subsystem determines a current computing device component inventory of the plurality of computing device components included in the computing device, measures a current computing device functionality of each of the plurality of computing device components, and identifies at least one computing device change between at least one of 1) a reference computing device component inventory and the current computing device component inventory, and 2) reference computing device functionalities and the current computing device component functionalities determined for each of the plurality of computing device components. Based in the at least one computing device change, the BIOS subsystem generates a Quarantine Action Metric (QAM) and, based on the QAM, performs at least one quarantine action associated with the computing device. As such, the nature of any computing device component tampering and/or hardware drift from a last-known safe/factory state of the computing device may be identified and used to automatically remediate any associated risk while minimizing computing device downtime.

As such, embodiments of the systems and methods of the present disclosure utilize measurements made as per the TCG Platform Certificate Profile (PCP) Specification Version 1.1 in order to generate a QAM value (e.g., a "PCP QAM") that is then utilized to perform quarantine action(s). One of skill in the art in possession of the present disclosure will recognize that the PCP QAM described herein may operate to quantity a drift in a Firmware Integrity Manifest (FIM) from a Reference Integrity Manifest (RIM) as a bitfield that may be utilized with policies that identify the severity of the drift that then drives quarantine action(s) that may remedy that drift. One of skill in the art in possession of the present disclosure will appreciate that the TCG-specified PCP provides a binary state outcome: either the device passes the FIM-to-RIM comparison (i.e., there is a match), or it fails and requires human intervention, and that PCP does not provide any indication of what is wrong with a computing device. As such, the PCP QAM discussed above provides insight into which component failed to match the RIM, and is utilized to facilitate the automated quarantine action and/or remediation described herein.

Furthermore, embodiments of the present disclosure provide a novel integrity measurement architecture (PCR1 attestation handler/Boot Integrity Status (BIS) attestation module) that is implemented in UEFI-based firmware and configured to perform deep state inspection/detection of hardware component-level status that is not available using conventional PCR1 measurements, and that operates to detect a departure from a RIM (which may be generated at the point of manufacture of the computing device, digitally signed, and stored in a TPM vaulted storage area). The PCR1 attestation handler/BIS attestation module may operate to detect device component changes, firmware configuration changes, and improper/unexpected operational behavior in computing device components.

Further still, embodiments of the present disclosure modify the UEFI boot process such that, at a TSL phase, a simple boot flag setting may determine the next step in the boot process, with a TSL UEFI OS loader either invoking a UEFI Micro operating system that runs as firmware and enables intelligent handling and secure boot of a custom-signed operating system (e.g., the host operating system), or that directs operation to an automated UEFI System Update Handler that may provide for quarantining of the computing device in the event of a pre-boot issue, and may perform automated remediation operations with an automated control plane/orchestrator in the event of such pre-boot issues.

Further still, embodiments of the present disclosure provide the firmware-based automated UEFI System Update Handler discussed above that provides a secure automated process to renormalize the computing device RIMs based on a command sequence that may be driven by an policy-based automated control plane/orchestrator, which one of skill in the art in possession of the present disclosure will recognize may require relatively high-level authorization prior to being permitted by the UEFI firmware in the computing device. As such, remediation processes driven either by the automatized UEFI System Update Handler or by passing the QAM to policy-based automated control plane/orchestrator may allow for renormalization of the PCP and PCR1 RIMs to new values, allowing the computing device to be automatically reset to a new reference state without the need for hands-on remediation.

Further still, embodiments of the present disclosure provide an integrity measurement architecture (PCR7 attestation handler/IMA) to perform validation that secure boot operations have been correctly maintained, with any breach of security resulting in modification of the QAM that was received from the UEFI environment, with that modified QAM associated with a severity value that may be utilized to determine a quarantine action and corresponding remediation process prior to completion of the boot process, or after completion of the boot process and during runtime operations for a computing device. As will be appreciated by one of skill in the art in possession of the present disclosure, any quarantine action/remediation process driven by the QAM may include renormalization of the computing device to automatically reset the computing device to a new reference state (but without the need for hands-on remediation). Furthermore, the firmware in the computing device may be instructed to reset the computing device to a last known safe/factory status via a securely authorized reboot command, with all data stored on writable disks in the computing device securely erased and all configuration information reset to factory values upon reboot, allowing the computing device to then be securely on-boarded, provisioned, and returned to service in the known safe/factory state.

Thus, the systems and methods of the present disclosure may provide a UEFI Micro Operating System facility that is capable of identifying critical quarantinable events or circumstances before boot of the host operating system. As will be appreciated by one of skill in the art in possession of the present disclosure, the automated handling of some critical/warning-level severity issues provides firmware-level remediation of recoverable incidents immediately through the boot process at the DXE phase, while some critical/warning-level issues at boot time may be passed to an automated control plane/orchestrator via the host operating system to allow for immediate remediation for edge computing devices on any quarantine state that might occur. Such quarantine handling, when coupled to the new UEFI firmware environment described herein, may be utilized to deliver a secure edge computing device that provides zero-trust, zero-touch, and zero-human-intervention environment.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing device quarantine action system, comprising:
- a computing device including a plurality of computing device components that each include hardware; and
- a Basic Input/Output System (BIOS) subsystem that is included in the computing device, that is coupled to the plurality of computing device components, and that is configured, during an initialization process for the computing device, to:
  - measure, using a Platform Configuration Register 1 (PCR1) attestation handler immediately prior to a Transient System Load (TSL) phase in the initialization process, a current computing device component functionality of each of the plurality of computing device components;
  - identify a computing device component functionality degradation based on a comparison of a first reference computing device component functionality for a first computing device component included in the plurality of computing device components and a first current computing device component functionality measured for the first computing device component that indicates degraded operation of the first computing device component;
  - identify an action to perform when the computing device component functionality degradation is identified for the first computing device component; and
  - perform the action.

2. The system of claim 1, wherein the action includes:
- halting the initialization process to prevent transition of the computing device to a runtime state.

3. The system of claim 1, wherein the action includes:
- providing, for display on a display device coupled to the computing device, information that describes the computing device component functionality degradation; and
- requesting authorization to proceed with the initialization process.

4. The system of claim 3, wherein the BIOS subsystem is configured to:
- receive the authorization to proceed with the initialization process; and
- modify, in response to receiving the authorization to proceed with the initialization process, the first reference computing device component functionality to include the first current computing device component functionality.

5. The system of claim 1, wherein the action includes:
- reconfiguring the computing device to provide the computing device in a previous state in which no computing device component functionality degradations were identified relative to the first reference computing device component functionality.

6. The system of claim 1, wherein the first reference computing device component functionality is identified in a Platform Configuration Register 1 (PCR1) certificate.

7. An Information Handling System (IHS), comprising:
a processing system; and
a memory system that is coupled to the processing system and that includes instructions that, when executed by the processing system, cause the processing system to provide a Basic Input/Output System (BIOS) engine that is configured, during an initialization process for the IHS, to:
measure, using a Platform Configuration Register 1 (PCR1) attestation handler immediately prior to a Transient System Load (TSL) phase in the initialization process, a current component functionality of each of a plurality of components that are coupled to the processing system;
identify a component functionality degradation based on a comparison of a first reference component functionality for a first component included in the plurality of components and a first current component functionality measured for the first component that indicates degraded operation of the first component;
identify an action to perform when the component functionality degradation is identified for the first component; and
perform the action.

8. The IHS of claim 7, wherein the action includes:
halting the initialization process to prevent transition of the IHS to a runtime state.

9. The IHS of claim 7, wherein the action includes:
providing, for display on a display device coupled to the processing system, information that describes the component functionality degradation; and
requesting authorization to proceed with the initialization process.

10. The IHS of claim 9, wherein the BIOS engine is configured to:
receive the authorization to proceed with the initialization process; and
modify, in response to receiving the authorization to proceed with the initialization process, the first reference component functionality to include the first current component functionality.

11. The IHS of claim 7, wherein the action includes:
reconfiguring the IHS to provide the IHS in a previous state in which no component functionality degradations were identified relative to the first reference component functionality.

12. The IHS of claim 7, wherein the first reference component functionality is identified in a Platform Configuration Register 1 (PCR1) certificate.

13. The IHS of claim 7, wherein the PCR1 attestation handler includes a Boot Integrity Status (BIS) attestation module that is implemented in Unified Extensible Firmware Interface (UEFI)-based firmware and that is configured to perform deep-state inspection of hardware component-level status for the first computing device component to identify the computing device component functionality degradation.

14. A method for addressing changes to component functionality in a computing device, comprising:
measuring, by a Basic Input/Output System (BIOS) subsystem during an initialization process for a computing device using a Platform Configuration Register 1 (PCR1) attestation handler immediately prior to a Transient System Load (TSL) phase in the initialization process, a current component functionality of each of a plurality of computing device components included in the computing device;
identifying, by the BIOS subsystem during the initialization process for the computing device, a computing device component functionality degradation based on a comparison of a first reference computing device component functionality for a first computing device component included in the plurality of computing device components and a first current computing device component functionality measured for the first computing device component that indicates degraded operation of the first computing device component;
identifying, by the BIOS subsystem during the initialization process for the computing device, an action to perform when the computing device component functionality that indicates degraded operation of the first computing device component is identified for the first computing device component; and
performing, by the BIOS subsystem during the initialization process for the computing device, the action.

15. The method of claim 14, wherein the action includes:
halting the initialization process to prevent transition of the computing device to a runtime state.

16. The method of claim 14, wherein the action includes:
providing, for display on a display device, information that describes the computing device component functionality degradation; and
requesting authorization to proceed with the initialization process.

17. The method of claim 16, further comprising:
receiving, by the BIOS subsystem during the initialization process for the computing device, the authorization to proceed with the initialization process; and
modifying, by the BIOS subsystem during the initialization process for the computing device in response to receiving the authorization to proceed with the initialization process, the first reference computing device component functionality to include the first current computing device component functionality.

18. The method of claim 17, wherein the action includes:
reconfiguring the computing device to provide the computing device in a previous state in which no computing device component functionality degradations were identified relative to the first reference computing device component functionality.

19. The method of claim 14, wherein the first reference computing device component functionality is identified in a Platform Configuration Register 1 (PCR1) certificate.

20. The method of claim 14, wherein the PCR1 attestation handler includes a Boot Integrity Status (BIS) attestation module that is implemented in Unified Extensible Firmware Interface (UEFI)-based firmware and that is configured to perform deep-state inspection of hardware component-level status for the first computing device component to identify the computing device component functionality degradation.

* * * * *